Dec. 2, 1930.  G. HOLMES  1,783,288
STEERING MECHANISM FOR SELF PROPELLED VEHICLES
Filed Dec. 29, 1927  2 Sheets-Sheet 1

INVENTOR.
GRANT HOLMES.
ATTORNEY.

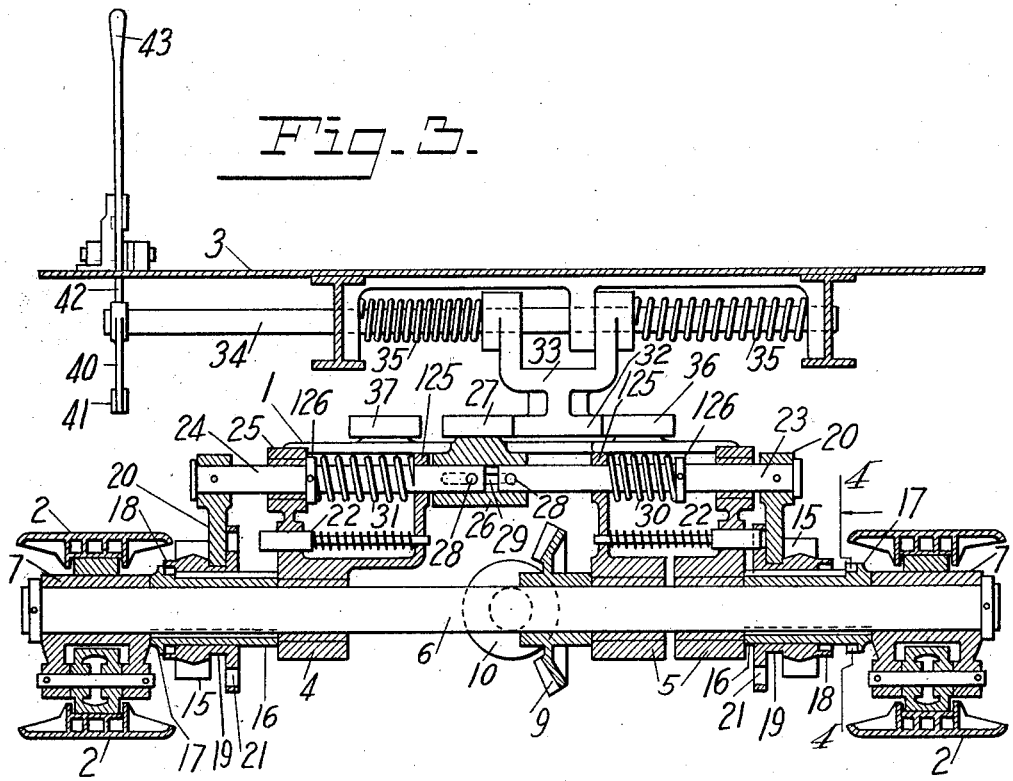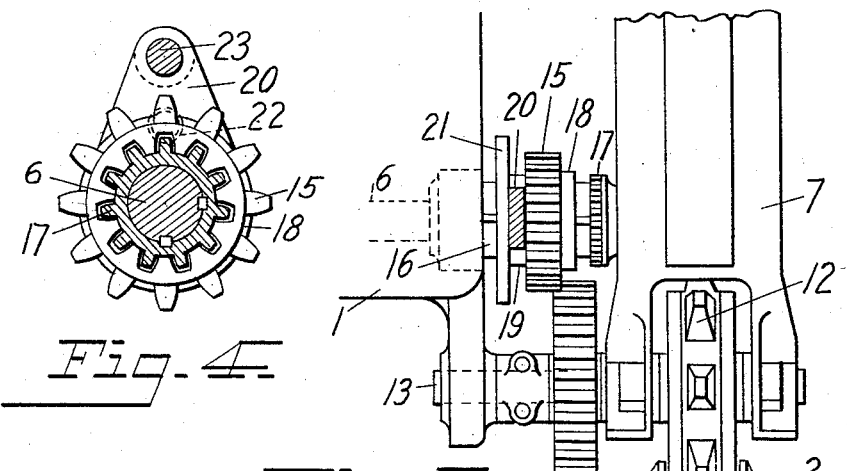

Patented Dec. 2, 1930

1,783,288

UNITED STATES PATENT OFFICE

GRANT HOLMES, OF DANVILLE, ILLINOIS

STEERING MECHANISM FOR SELF-PROPELLED VEHICLES

Application filed December 29, 1927. Serial No. 243,446.

This invention relates to steering mechanism for self-propelled vehicles and is designed more particularly for use on power operated shovels, or other excavating mechanisms, of that type in which there is a base or main frame mounted on crawling traction devices and an upper structure or platform rotatably mounted on the base and carrying the excavating mechanism and power plant. A machine of this kind is steered by disconnecting one of the traction devices from the driving mechanism and actuating the other driving device, thus causing the machine to turn. Ordinarily the clutches are shifted by a man on the ground but it has been proposed to provide means for connecting the clutches with the revolving platform so that the swinging movement of that platform may be utilized to shift the clutches, thereby enabling the steering to be controlled by an operator on the platform. These machines are often of very large size and the revolving platform is of great weight and the momentum thereof may cause breakage of the clutch mechanism or the connecting devices if the movement is not carefully controlled.

One object of the invention is to provide a steering mechanism of this kind in which operative movement may be imparted to the clutch shifting devices by an operator on the rotatable platform and by means other than the platform.

A further object of the invention is to provide a steering mechanism in which an actuating device will be positioned with relation to the clutch shifting devices by the rotation of the platform but will be operated by means independent of the rotation of the platform to cause the clutches to be shifted.

A further object of the invention is to provide such a mechanism which will be simple in its construction, easily operated and of such a character that there will be little or no danger of the mechanism being injured in the operation of the clutches.

Other objects of the invention will appear as the mechanism is described in detail.

Figure 1:
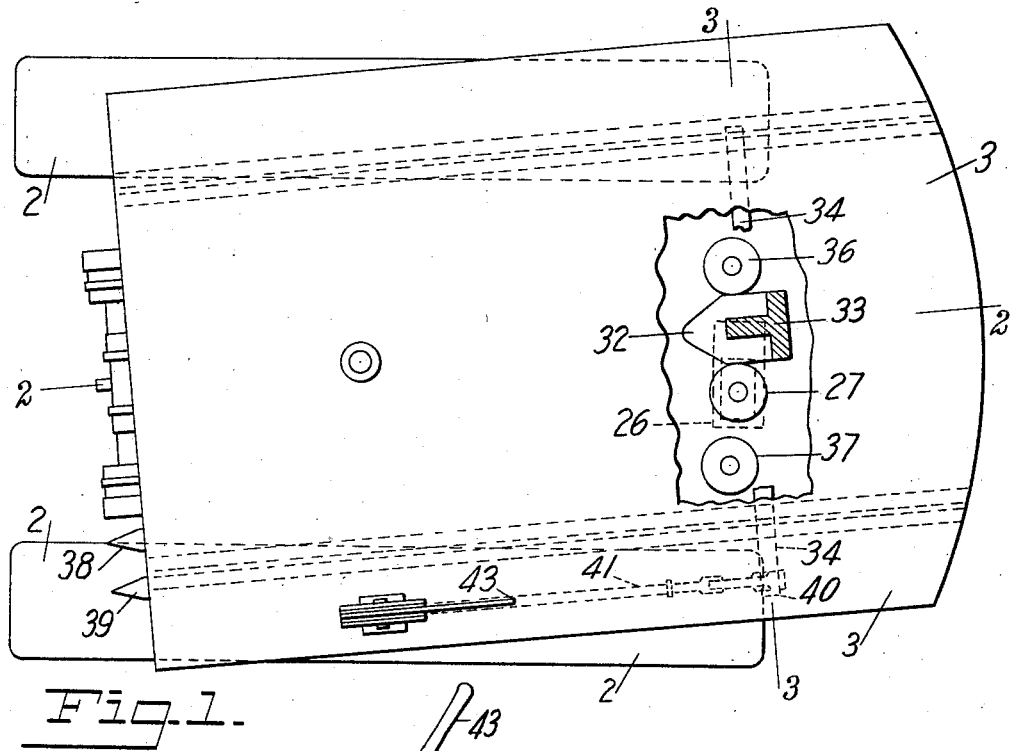
Figure 2:
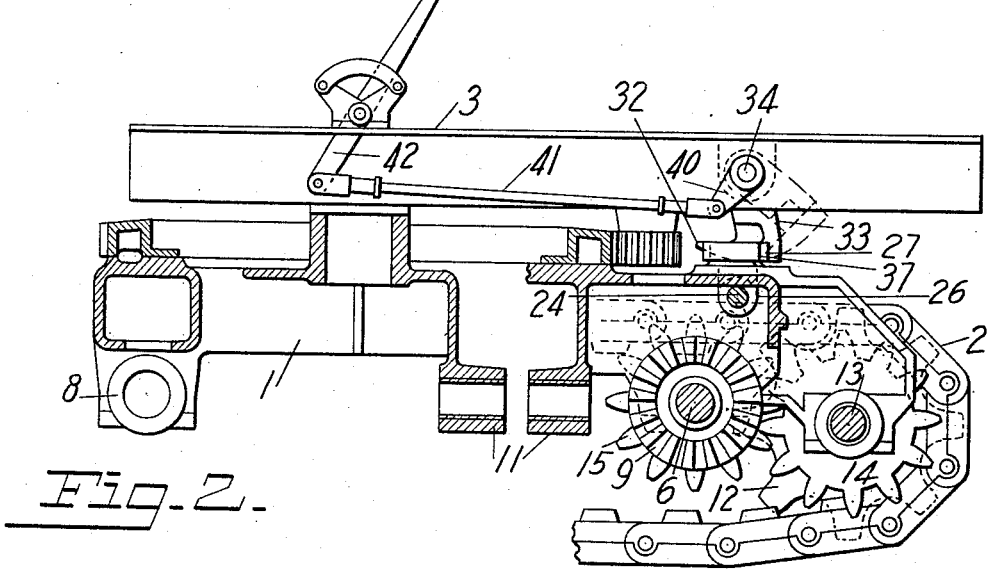

In the accompanying drawings Fig. 1 is a plan view of a portion of an excavating machine, partly broken away, showing the invention applied thereto; Fig. 2 is a side elevation of the mechanism shown in Fig. 1, partly broken away; Fig. 3 is a transverse section taken on the line 3—3 of Fig. 1; Fig. 4 is a transverse section taken on the line 4—4 of Fig. 3; and Fig. 5 is a plan view of one of the clutches and its associated gearing.

In these drawings I have illustrated one embodiment of my invention and have shown the same as applied to a power shovel of the rotary type but it will be understood that the mechanism may take various forms and may be used in connection with traction operated devices of various kinds, which employ a rotatable structure.

The power operated shovel to which the invention is here applied comprises a base or main frame 1 which is supported by crawling traction devices 2 arranged on the respective sides thereof. Rotatably mounted on this main frame is a platform 3 which carries the power plant and excavating mechanism, not here shown, and the rotation of which is under the control of an operator thereon. Journaled in suitable bearings 4 and 5 at one end of the main frame is a transverse shaft or axle 6 which extends beyond the sides of the frame and on which the longitudinal frame member 7 of the crawling traction devices are mounted. The frame 1 is provided near its other end with bearings 8 in which is mounted a second axle, not shown, which supports the forward ends of the frame members 7 of the traction devices. The rear axle 6 has secured thereto a beveled gear 9 which meshes with a second beveled gear 10 carried by a propelling shaft journaled in bearings 11 on the main frame and connected in the usual or any suitable manner with the power plant on the platform 3. Each traction device has at each end of its frame 7 a tumbler or large sprocket wheel 12 about which the endless track extends, one of these tumblers only being shown in Fig. 2. This tumbler is carried by a shaft 13 and rigidly secured to the tumbler shaft 13 is a gear 14 which meshes with a gear 15 on the axle or shaft 6. The gear 15 is loosely mounted on the shaft 6 and suitable means are provided for connecting the same with and disconnecting the same from that shaft or axle so that the adjacent traction device may be driven or may remain idle. In the construction here shown, a sleeve 16 is keyed to the axle 6 and is provided at its outer end with a clutch member 17. The gear 15 is rotatably and slidably mounted on the sleeve 16 and has at its outer end a clutch member 18 adapted to be moved into and out of operative engagement with the clutch member 17. The gear 15 also has the usual yoke groove 19 to receive a clutch shifting yoke 20. Preferably the gear 14 is of such a width that the clutch members may be separated without disengaging the gear 15 from the gear 14 and means are provided for locking the gear against rotation when it is disengaged from the axle, thus locking the traction device against movement. In the present instance, the flange forming the inner wall of the yoke groove 19 is enlarged and provided with a circumferential series of openings 21, one of which will be engaged by a yieldable plunger 22 when the gear is moved to disengage the clutch members. It will be obvious that instead of using clutch members to connect the gear with and disconnect the same from the axle that the connection between the axle and the traction device may be controlled by moving one gear into and out of mesh with the other and such an arrangement would, in the present arrangement, be the full equivalent of the clutch.

Mounted on the main frame or base 1 is suitable mechanism for selectively operating the clutches on the opposite sides of the machine and this mechanism is adapted to be operated by an actuating device carried by the revolving structure or platform 3. The actuating member is so arranged that it may be moved into an operative position with relation to the clutch shifting mechanism by the rotatory movement of the platform and may then be operated either manually or otherwise to cause it to engage a part of the clutch shifting mechanism and shift one or the other of the clutches, depending upon the position of the actuating device with relation to the clutch operating mechanism. As here shown, the clutch operating mechanism comprises two separately movable operating members, such as rods 23 and 24 which are slidably mounted in bearings 25 and 125 on the main frame and are connected at their outer ends with the respective yokes 20. In the present instance, the two rods are arranged in longitudinal alinement and have their inner ends mounted in a sleeve 26 which is provided with a contact member, such as a roller 27 adapted to be engaged by the actuating member on the rotating frame. The inner ends of the rods 23 and 24 are provided with laterally extending projections or pins 28 which extend into a longitudinal slot 29 in the sleeve, the arrangement being such that when the sleeve is in its neutral or central position the pins will lie adjacent to the respective ends of the slot. Thus when the sleeve is moved in either direction it will carry with it one or the other of the clutch actuating rods but the other rod will not be moved. Springs 30 and 31 confined between the inner bearings 125 and collars 126 rigidly secured to the respective rods 23 and 24 serve to retain the sleeve normally in a neutral or central when the control member 27 is released and to restore the disengaged clutch to its engaged position. It will be apparent therefore, that the contact member 27 is so connected with the clutch actuating members that when the contact member is moved in one direction it will impart movement to one clutch and when it is moved in the other direction it will impart movement to the other clutch.

The actuating device which is carried by the rotatable structure may be of any suitable character but preferably it is mounted for movement transversely to the direction of movement of the clutch actuating rods 23 and 24, in the present instance it moves lengthwise of the structure on which it is mounted. The actuating member is so shaped that it will engage the contact member 27 with a cam action and laterally displace the same and for this purpose it has one or more contact surfaces extending obliquely to the line of its movement. In the present instance, the actuating device is in the form of a flat head 32, the forward end of which is tapered, so that the forward portions of both lateral edges are oblique to its length. This head is carried by a bracket 33 which is mounted on a transverse shaft 34 journaled in the longitudinal members of the rotatable structure 3. Preferably the bracket is splined onto the shaft so that it will be caused to rotate therewith but will have sliding movement thereon. Springs 35 coiled about the shaft 34 on opposite sides of the bracket hold the latter normally in its central position. The springs 35 are not of sufficient strength to hold the bracket against transverse movement when the actuating head 32 engages the contact member 27 and I prefer to provide suitable guides, such as rollers 36 and 37 which are mounted on fixed axes on the opposite sides of the contact member 27 and are spaced some distance therefrom so that when the actuating device enters the space between the movable roller or contact member 27 and one of the stationary rolls the stationary roller will hold it against transverse movement in one direction and cause it to impart movement to the contact member and the clutch actuating device with which the contact member is connected. The actuating device is brought into operative position on one side or the other of the contact member 27 by rotating the structure 3, it being understood that this actuating device is normally supported in such a position that it may rotate with the upper structure without coming in contact either with the contact member or the stationary rollers. The actuating device being pointed and the rollers being spaced some distance apart the operative position of the actuating device may vary to a considerable extent and a skilled operator would have no difficulty in properly positioning the same. However, if desired, the upper structure 3 may be provided with means to indicate the position of the actuating device and, as here shown, the forward end of that structure has secured thereto two pointers 38 and 39 which are so arranged that when one pointer is in line with the inner edge of the adjacent traction device the actuating device will be positioned on one side of the contact member 27 and when the other pointer is in line with the inner edge of said traction device the actuating device may be positioned on the other side of the contact member 27. Any suitable means may be provided for imparting operative movement to the actuating device and, in the present instance, means are provided for manually operating the same. As here shown, a crank arm 40 is secured to one end of the shaft 34 and connected by a rod 41 with the lower end of a lever 42 pivotally mounted on the platform 3 and having its upper end or handle portion 43 arranged adjacent to the operator's station. Thus after the actuating device has been properly positioned in such relation to the contact member 27 as to cause the operation of the desired clutch actuating device the lever 43 is manipulated to force the actuating device between the movable contact member and the stationary roller, thereby moving the contact member and one of the clutch actuating rods and compressing the spring on that side of the sleeve 26 towards which it is moving. Preferably the rear portions of the lateral edges of the actuating device are substantially parallel so that the pressure of the spring on the roller 27 will not tend to displace the actuating device. When the turning movement has been completed the lever is manipulated to withdraw the actuating device and the spring which has been compressed expands and returns the contact member to its normal position.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a mechanism comprising a main frame, a structure rotatably mounted on said main frame, traction devices supporting said main frame, and clutches to connect the respective traction devices with driving mechanism, mechanism carried by said main frame to selectively operate said clutches, an actuating device mounted on said rotatable structure for movement lengthwise thereof and arranged to be moved into operative relation with said clutch operating mechanism by the rotation of said structure, and means mounted on said rotatable structure for moving said actuating device lengthwise of said rotatable structure to cause the same to operatively engage said clutch operating mechanism.

2. In a mechanism comprising a main frame, a structure rotatably mounted on said main frame, traction devices supporting said main frame and clutches to connect the respective traction devices with driving mechanism, mechanism carried by said main frame to selectively operate said clutches and comprising a contact member movably transversely to said main frame, an actuating member carried by said rotatable structure, movable to a position adjacent to said contact member by the rotatory movement of said rotatable structure and movable lengthwise of said rotatable structure into and out of operative engagement with said contact member, and means on said rotatable structure for moving said actuating member lengthwise thereof into operative engagement with said contact member and thereby actuating said clutch operating mechanism.

3. In a mechanism comprising a main frame, a structure rotatably mounted on said main frame, traction devices supporting said main frame and clutches to connect the respective traction devices with driving mechanism, mechanism carried by said main frame to selectively operate said clutches and comprising a contact member, an actuating member movably mounted on said rotatable structure, having a contact surface oblique to its line of movement to engage said contact member and arranged to be moved to a position adjacent to said contact member by the rotatory movement of said structure, and means on said structure for causing the oblique surface of said actuating member to operatively engage said contact member and thereby actuate said clutch operating mechanism.

4. In a mechanism comprising a main frame, a structure rotatably mounted on said main frame, traction devices supporting said main frame, and clutches to connect the respective traction devices with driving mechanism, mechanism carried by said main frame to selectively operate said clutches, an actuating member pivotally mounted on said rotatable structure and movable therewith into operative relation to said clutch operating mechanism, and means carried by said rotatable structure to move said actuating member about its axis and thereby cause it to impart movement to said clutch operating mechanism.

5. In a mechanism comprising a main frame, a structure rotatably mounted on said main frame, traction devices supporting said main frame, and clutches to connect the respective traction devices with driving mechanism, mechanism carried by said main frame to selectively operate said clutches, an actuating device carried by said rotatable structure and movable therewith into operative relation to said clutch operating mechanism, and a manually operated device mounted on said rotatable structure at a point remote from said actuating device and connected with said actuating device to cause the latter to impart operative movement to said clutch operating mechanism.

6. In a mechanism comprising a main frame, a structure rotatably mounted on said main frame, traction devices supporting said main frame, and clutches to connect the respective traction devices with driving mechanism, mechanism carried by said main frame to selectively operate said clutches and comprising a contact member, a fixed guide carried by said main frame and spaced from said contact member, an actuating member movably mounted on said rotatable structure, having forwardly converging surfaces and arranged to be moved by the rotatory movement of said structure into line with the space between said contact member and said guide, and means on said structure for forcing said actuating member between said contact member and said guide, thereby causing said contact member to impart movement to one of said clutches.

7. In a mechanism comprising a main frame, a structure rotatably mounted on said main frame, traction devices supporting said main frame, and clutches to connect the respective traction devices with driving mechanism, separately movable clutch actuating members connected with the respective clutches, a contact member so arranged that when moved in one direction it will impart movement to one clutch actuating member and when moved in the other direction will impart movement to the other clutch actuating member, an actuating device carried by said rotatable structure and movable therewith into a position adjacent to either side of said contact member, and means on said rotatable structure to move said actuating device into operative engagement with said contact member.

8. In a mechanism comprising a main frame, a structure rotatably mounted on said main frame, traction devices supporting said main frame, and clutches to connect the respective traction devices with driving mechanism, rods slidably mounted on said main frame and connected with the respective clutches, a sleeve slidably mounted on the adjacent ends of said rods and so connected with said rods that when moved in one direction it will actuate one rod and when moved in the other direction it will actuate the other rod, a contact member carried by said sleeve, an actuating device carried by said rotatable structure and movable therewith into a position adjacent to said contact member, and means for moving said actuating device into engagement with said contact member and imparting movement to the latter.

9. In a mechanism comprising a main frame, a structure rotatably mounted on said main frame, traction devices supporting said main frame, and clutches to connect the respective traction devices with driving mechanism, separately movable clutch actuating members connected with the respective clutches, a movable contact member having means for imparting movement to one of said clutch actuating members when said contact member is moved in one direction and for imparting movement to the other of said clutch actuating members when said contact member is moved in the other direction, guides arranged on the opposite sides of and spaced from said contact member, an actuating device movably mounted on said rotatable structure, having forwardly converging lateral portions and movable with said structure into line with the space between said contact member and either of said guides, and means on said rotatable structure for forcing said actuating member into that space with which it is in line.

10. In a mechanism comprising a main frame, a structure rotatably mounted on said main frame, traction devices supporting said main frame, and clutches to connect the respective traction devices with driving mechanism, mechanism carried by said main frame to selectively operate said clutches and comprising a contact member, a guide arranged adjacent to said contact member and held against bodily movement, an actuating member mounted on said rotatable structure for movement lengthwise thereof and transversely thereto and movable with said structure into line with the space between said contact member and said guide, and means on said structure for moving said actuating member lengthwise of said structure into operative engagement with said guide and said contact member.

11. In a mechanism comprising a main frame, a structure rotatably mounted on said main frame, traction devices supporting said main frame, and clutches to connect the respective traction devices with driving mechanism, mechanism mounted on said main frame for selectively operating said clutches and comprising a contact member, a shaft journaled on said rotatable structure, an actuating device mounted on said shaft and rotatable therewith into operative engagement with said contact member, and a lever operatively connected with said shaft.

12. In a mechanism comprising a main frame, a structure rotatably mounted on said main frame, traction devices supporting said main frame, and clutches to connect the respective traction devices with driving mechanism, mechanism mounted on said main frame for selectively operating said clutches and comprising a contact member, a shaft journaled on said rotatable structure, a bracket mounted on said shaft for rotation therewith and for sliding movement thereon, a head carried by said bracket, and a lever operatively connected with said shaft to rotate the same and thereby move said head into operative engagement with said contact member.

In testimony whereof, I affix my signature hereto.

GRANT HOLMES.